Nov. 17, 1931.  A. T. NABSTEDT  1,832,467
REVERSE GEAR
Filed Feb. 6, 1929   3 Sheets-Sheet 1

Nov. 17, 1931.  A. T. NABSTEDT  1,832,467
REVERSE GEAR
Filed Feb. 6, 1929  3 Sheets-Sheet 3

Inventor
Arthur T. Nabstedt
By Rockwell & Bartholow
Attorneys

Patented Nov. 17, 1931

1,832,467

UNITED STATES PATENT OFFICE

ARTHUR T. NABSTEDT, OF HAMDEN, CONNECTICUT, ASSIGNOR TO THE SNOW & PETRELLI MANUFACTURING COMPANY, OF NEW HAVEN, CONNECTICUT

REVERSE GEAR

Application filed February 6, 1929. Serial No. 337,862.

This invention relates to power transmission gears, and more particularly to such gearing of the type generally used with marine engines and known as reverse gears. In this type of gearing it is desirable that the mechanism efficiently transmit power from the engine shaft to the propeller shaft smoothly without vibration, that it be long-lived and reliable and occupy a minimum amount of space when installed.

One of the objects of this invention is to provide an improved reverse gear, which will be economical to manufacture, efficient in use, and which may be readily installed, be long-lived, sturdy and reliable.

Another object of this invention is to provide an improved casing for a gear of this type, which will facilitate the manufacture and assembly of the parts thereof, and permit the manufacture of a completed gear having a minimum overall length.

Still another object of this invention is to provide an improved end plate member for a casing of a gear of this type, which will be readily removable or adjustable to adjust operable parts of the gear while being firmly supported in position, centralized with respect to the casing and adapted to assist in the alignment of the connected shafts.

A further object of this invention is to provide an improved gear of the above type, which may be readily installed between a driving element and a driven element without the necessity of substantially dismantling the gear, or of disturbing particularly essential operable parts thereof.

A still further object of this invention is to provide an improved control for such a gear, whereby the same will be long-lived.

To these and other ends, the invention consists in the novel features and combination of parts to be hereinafter described and claimed.

Figure 1:
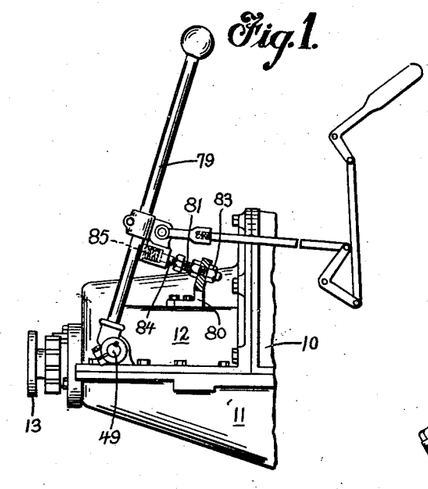
Fig. 1 illustrates the transmission gear casing of a marine engine, in which a gear embodying the features of this invention may be installed, and particularly illustrates an improved control for the reverse gear.

The transmission gear selected to illustrate the features of this invention is one of the type known as reverse gears, and is particularly applicable for use with marine engines. Fig. 1 illustrates the rear end portion 10 of a marine engine or the like, having a gear housing 11 cast integral with the engine crank case housing. The gear housing 11 is provided with a cover 12, which may be secured in place after the reverse gear has been installed. The driven shaft of the reverse gear extends rearwardly through the housing 11, and is provided with a part 13, which may be a portion of a flange coupling, to which the propeller shaft may be coupled.

A reverse gear suitable for such installation is illustrated in Figs. 2 to 8 inclusive, and generally comprises an outer casing composed, in this instance, of a drum in three portions, two end rings 14 and 15, an intermediate ring 16, and end plates or covers 17 and 18, all of which may be bolted together by bolts 69. The reverse gear is also provided with an engine sleeve and gear 19, a propeller sleeve and gear 20, suitable connecting gearing between the sleeves, improved clutch and clutch operating mechanisms, and a brake band 21. The engine sleeve and gear 19 may be connected to an engine shaft 22 by means of a key 23 and the propeller sleeve and gear 20 may be keyed to a stud shaft 24, by a key 25, and then by means of the flange coupling part 13 connected to the propeller or other driven shaft (not shown). In making these connections it is desirable that a minimum number of parts of the reverse gear be disturbed or removed therefrom, and, therefore provision is made for the removal of the sleeve gears 19 and 20, without disturbing any other of the essential operative parts of the reverse gear.

Figure 2:
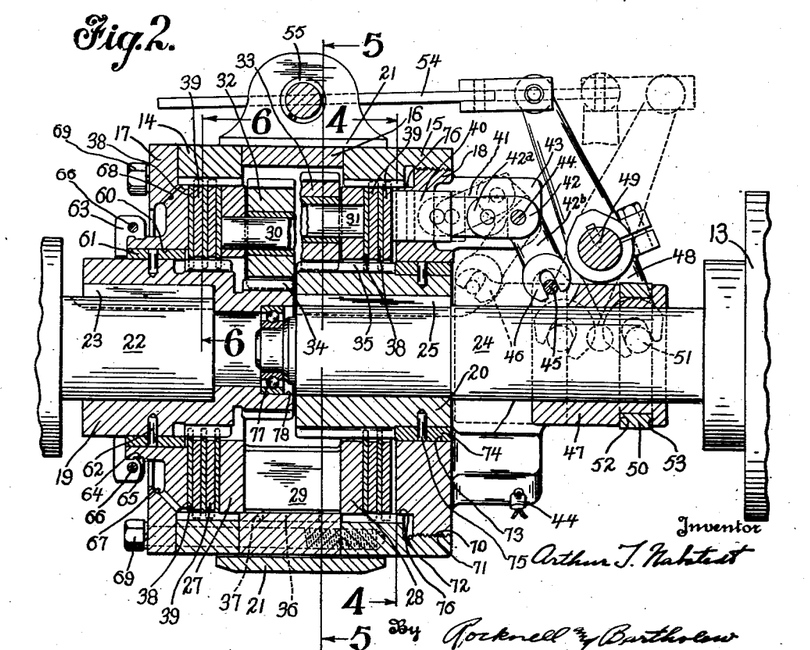
Fig. 2 is a vertical section through a reverse gear embodying the features of this invention, taken along lines 2—2 of Fig. 5, the upper left-hand portion of this figure being taken along lines 2—2A of Fig. 5, for the purpose of more completely illustrating the interior thereof.
Figure 3:
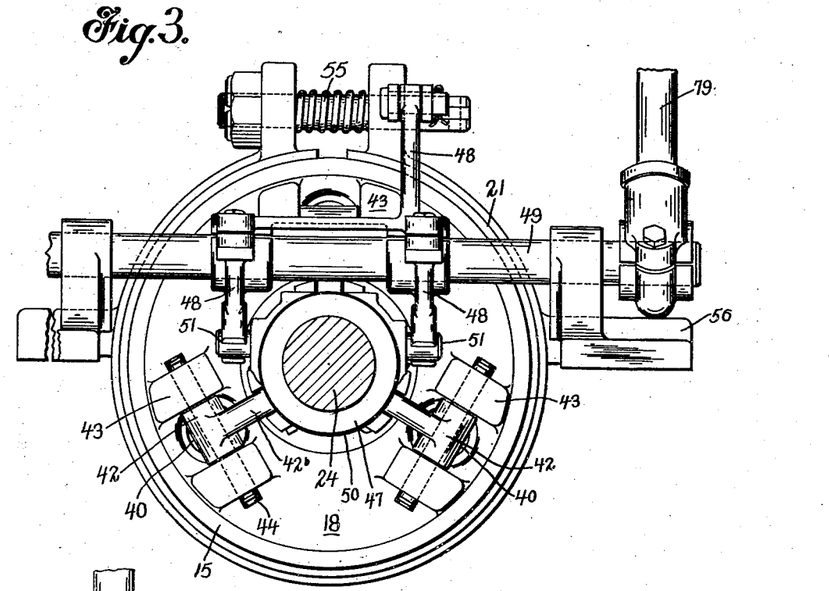
Fig. 3 is an end view of the driven end of the gear.
Figure 4:
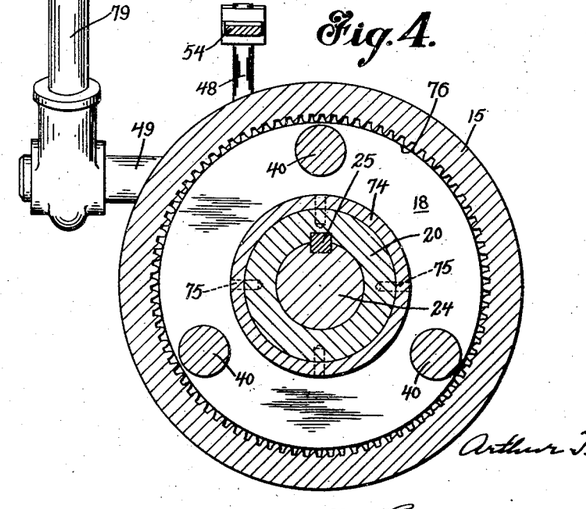
Fig. 4 is a section on lines 4—4 of Fig. 2.
Figures 5, 6, 7, 8:
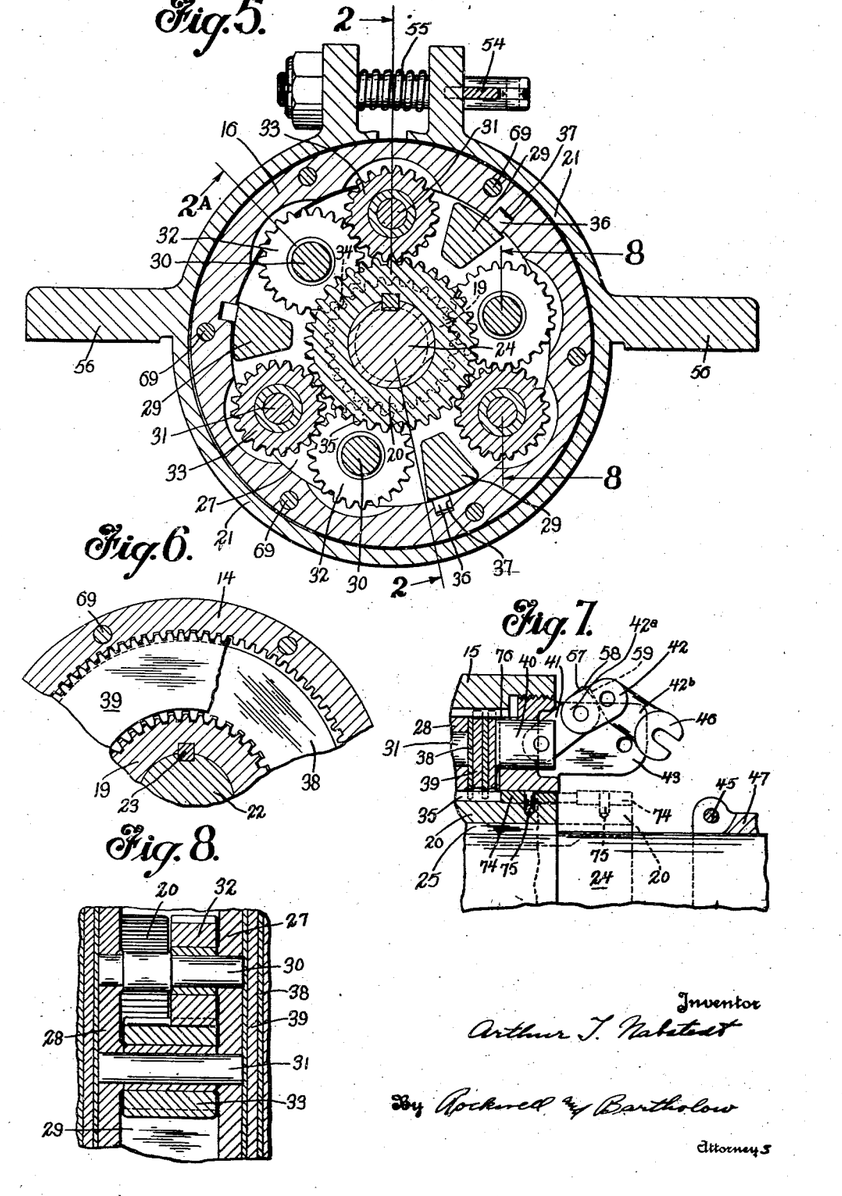
Fig. 5 is a section on lines 5—5 of Fig. 2.
Fig. 6 is a section on lines 6—6 of Fig. 2.
Fig. 7 is a partial sectional view of certain parts shown in Fig. 2, to illustrate a feature of this invention.
Fig. 8 is a section on lines 8—8 of Fig. 5.
Figure 9:
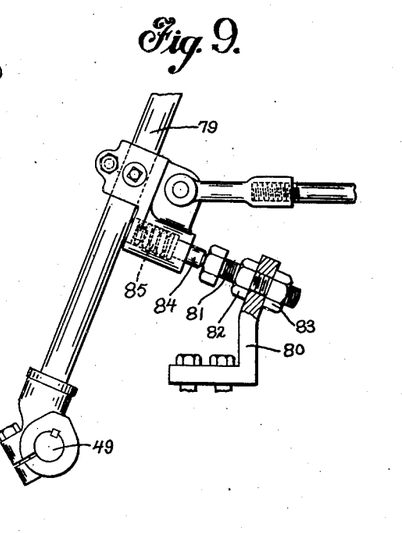
Fig. 9 is an enlarged view of a portion of the improved control mechanism illustrated in Fig. 1.

A floating pinion cage composed of end plates 27 and 28, which are joined together by cross-bars 29, is disposed within the gear casing formed by the three-part drum and the end plates. Between the cage end plates 27 and 28, and rotatably mounted upon pinion studs 30 and 31 that extend from one plate to the other, are pinions 32 and 33. In this instance, three sets of pinions 32 and 33 are provided. The teeth of the pinions 32 are adapted to mesh with teeth 34 formed upon the inner end of the engine or driving sleeve gear 19, and also with the teeth of the pinion 33, which is of such length that it extends substantially from one cage end plate to the other. The teeth of the pinion 33 are adapted to mesh with teeth 35, formed upon the propeller or driven sleeve gear 20. The gear cage is secured against rotation relatively to the casing, in this instance by means of lugs 36 formed upon the cross-bars and disposed in cooperating grooves 37, formed in the intermediate casing ring 16. The lugs 36 and cooperating grooves 37 are adapted to permit the cage to slide axially with respect to the reverse gear, while retaining it against rotation relatively thereto and, therefore, the cage and the pinions supported thereby may be said to float axially with respect to the axis of the gear. Due to the above structure and arrangement of the parts thereof, the rotation of the engine shaft 22 will rotate pinions 32; which in turn rotate pinions 33 whereby the propeller shaft 24 will be rotated in a direction reverse to that of the engine shaft when the casing is held against rotation by means of the brake-band 21, which is provided and adapted for this purpose.

Between the end plates 27 and 28 of the gear cage and the casing end plates 17 and 18 respectively, a series of clutch disks 38 and 39 is disposed. The disks 38 of each series are secured to the respective adjacent sleeve 19 or 20, by means of cooperating teeth on both parts, and the disks 39 of each series are secured to the respective casing end ring 14 or 15 by means of cooperating teeth on both parts. By this arrangement, disks 38 will rotate with the respective sleeves 19 and 20, and disks 39 will rotate whenever the casing is permitted to rotate.

Plungers 40, there being in this instance three, are slidably mounted in and extend through the casing end plate 18, and are adapted to engage the end face of the adjacent disk 39 at spaced apart points thereabout. Each plunger 40 has one end of a link 41 pivotally secured thereto, the other end of which link is pivoted to one arm 42$^a$ of a bell crank 42. The bell crank 42 is pivoted to supporting lugs 43, secured to or formed as a part of the casing plate 18, by a removable pivot pin 44. The other arm 42$^b$ of each of the bell cranks 42, is forked and engages a pivot pin 45 within the forked portion 46 thereof. The pivot pins 45 are mounted in a clutch operating collar 47, which may be slidably mounted for axial movement upon the propeller stud shaft 24. Movement of the clutch collar 47 along the shaft 24 in one direction, will, therefore, rock the bell crank 42 and swing the link 41 into the position shown in full lines in Fig. 2, whereby the plungers 40 will force the series of disks 38 and 39 there-adjacent against the cage plate 28, and slide the cage and pinions carried thereby toward the end plate 17. This action will cause the series of disks adjacent the end plate 17 to be clamped thereagainst, and rotatably connect the sleeve 19 with the sleeve 20, to permit the shaft 22 to drive the shaft 24 in the same direction when the casing is released from the clamping action of the brake-band 21.

In order to insure that the toggle joint formed by the link 41 and the arm 42$^a$ of the bell crank 42, does not substantially pass the clamping position thereof, the end 57 of this link is provided with a stop shoulder 58, which engages a cooperating shoulder 59, formed upon the arm 42$^a$. Preferably, the arrangement is such that these parts are permitted to assume a position slightly below the dead center of the toggle, so formed, to insure that vibration will not loosen the same.

The clutch operating collar 47 may be operated by a forked lever 48, which is secured to and rockable with a shaft 49. The forked end of the lever 48 straddles a carrier yoke 50, and engages lugs 51 that extend from each side thereof. The carrier yoke 50 rides in a groove formed in the collar 47, and alternately engages shoulders 52 and 53 to shift the collar upon the shaft 24 in either direction. In this instance, the yoke 50 engages shoulder 53 to operate the plunger 40 into disk and cage clamping position, as illustrated in Fig. 2. The other end of the lever 48 is secured to a brake-band operating rod 54, that may operate in any well known manner against a spring 55, to permit the release of the brake-band 21 from casing clamping position, or to cause the same to clampingly engage the periphery of the casing. The brake-band 21 is provided with means to engage a stationary support to retain it against rotation, feet 56 being provided for this purpose.

The casing end plate 17 is secured against the casing ring 14 by means of bolts 69, and is provided with a centrally disposed opening 60 in which the sleeve 19 is journaled. A bushing 61, preferably of some bearing material such as brass, is secured to the sleeve 19 and disposed between the periphery of the same and the periphery of the opening 60. The bushing 61 is preferably secured to the sleeve 19, by means of pins 62. A collar 63 which in this instance is split, is provided to retain the sleeve 19 in place against axial movement and within the opening 60. The collar 63 engages the plate 17, and when of the form shown is secured thereto against axial movement by means of an annular rib 64 formed on the collar and adapted to be disposed in an annular groove 65, formed in a hub portion of the plate 17. The collar 63 extends radially toward the sleeve 19 and overlaps the outer end of the bushing 61. By this arrangement, the sleeve 19 is retained in position within the opening 60 and against axial movement therefrom. The removal of bolts 66, that are provided to retain the separable parts of the split collar 63 together, permits the separation of these parts and the removal thereof, whereby the sleeve 19 may be drawn axially from the reverse gear without disturbing other parts thereof. A reverse operation permits these parts to be readily reassembled after the sleeve 19 has been secured to the driving shaft 22.

The plate 17 may be also provided with an undercut oil groove 67, which is disposed in its outer face and from which openings 68, which communicate with the interior of the gear casing, extend. Automatic and efficient oiling of the reverse gear is insured by this arrangement, oil being placed in the housing 12 (see Fig. 1), to the proper level, whereby it will be entrapped in the groove 67 and by centrifugal force caused to flow through the openings 68 into the gear casing, when the reverse gear is operated to permit rotation of the same.

The casing end plate 18 is secured to the casing ring 15 by means of the cooperation between threads 70 formed upon the periphery of plate 18, and threads 71 formed upon the periphery of an opening 72 provided in ring 15. This structure permits adjustment of the plate 18 with respect to the casing and the parts within the same axially with respect thereto, whereby the plungers 40 are likewise axially adjustable with respect to these parts, so as to increase or decrease the clamping effect thereof. The plate 18 is provided with a centrally disposed opening 73, in which the sleeve 20 is journaled, a bushing 74 of suitable bearing material being pinned by means of pins 75 upon the periphery of the sleeve 20. The removal of pivot pin 44 upon which the bell crank 42 is pivoted, and the disengagement of the forked portion 46 from the pivot pins 45, permits the swinging of the bell crank 42 and the link 41 into the position shown in Fig. 7, whereby the sleeve 20, and the stud shaft 24 when the same is connected thereto, may be removed axially from the reverse gear. A reverse operation permits these parts to be readily reassembled. Both of these operations may be performed without removing or disturbing any of the other parts of the reverse gear.

The plate 18 is also provided with means to relieve any strain that might be imposed upon the threads 70 and 71, due to vibration or other movement of associated parts, and to insure centralization of the plate 18 with respect to the casing, as well as to insure proper and continuous alignment of shafts 22 and 24. In the present instance, this means comprises an inwardly directed centering extension formed upon the inner face of the plate 18, and of a diameter substantially equal to the interior diameter of a part of the casing ring 15, at the adjacent portion thereof. The centering extension, therefore, projects to an extent within and interiorly supports that part of the ring 15 which is of reduced diameter and is provided with longitudinal grooves for engagement with clutch disk lugs, as shown in Fig. 2. All bearing strains are, therefore, relieved from the threads 70 and 71, being communicated to the shaft 24 from the casing through the extension 76, plate 18, bushing 74 and sleeve 20. To further insure alignment of the shafts 22 and 24, a ball bearing 77 may be disposed in a counterbore 78, provided in the inner end of the bushing 19, in which a reduced portion of the shaft 24 may be journaled.

When the reverse gear is installed in a housing 11, such as above described, the shaft 49 is extended through a wall thereof and a hand lever 79 is secured to the outer end thereof. It is often desirable to extend the control of the gear either forwardly or rearwardly of the motor or engine 10, into a more accessible position, such as into a pilot house, or to the helmsman's position, and, therefore, a system of reverse links and bell cranks such as shown more or less diagrammatically in Fig. 1, are suitably arranged for this purpose. Due to the weight of the various parts constituting this remote control, there is often a considerable pull exerted upon the lever 79 after the same has been shifted into an operative position, and as this pull is continuously acting, under these conditions, the yoke 50 is forced against the shoulder 53 of the collar 47, and considerable wear upon the surface of these parts is experienced. To substantially prevent this wear and compensate for the weight of the remote control parts, means is provided which may be formed as illustrated and comprises a bracket 80 adapted to be secured adjacent the control lever 79, to a part of the housing 11, or any other stationary member of the installation. A threaded stud 81, passes through the bracket 80 and extends toward the lever 79. The stud 81 is secured to the bracket 80, by means of nuts 82 and 83, whereby the amount the stud 81 extends from the bracket toward the lever 79, may be adjusted. A cushioning device, comprising, in this instance, a spring pressed plunger 84, is secured to the lever 79 in such position that it will engage the end of the stud 81. The spring tension on the plunger is such as to compensate for the weight of the remote control parts when the reverse gear is in the position shown in full lines in Fig. 2, whereby the additional pressure of the yoke 50 upon the shoulder 53, of the collar 47, by the weight of the remote control parts, is eliminated. By adjustment of the stud 81, the tension of the spring 85 may be increased or decreased, as desired. Other arrangements of the parts are possible to obtain the results desired, whereby the weight of the levers and bell cranks are compensated for and the reverse gear parts relieved from the effect thereof.

A reverse gear of this invention is usually received by the user in assembled and adjusted position, and as above pointed out, the sleeves 19 and 20 may be readily removed therefrom and connected to the driving and driven shafts respectively, and as readily reassembled in the gear. After being installed, the driving connection may be made between shaft 22 and shaft 24 by manipulating the control lever 79, to shift the collar 47 to the right, as shown in Fig. 2, which operation rocks the bell crank 42 to force the plunger 40 inwardly to cause the clamping engagement above described, between the series of disks 38 and 39, the pinion cage and end plate 17. The position of the parts as thus arranged, is shown in full lines in Fig. 2, it being understood that the brake-band operating rod 54 has been operated to release the brake-band 21 from clamping engagement with the casing.

When the parts are shifted into dotted position shown in Fig. 2, the clamping engagement between the series of disks 38 and 39, the pinion cage, and the plate 17, is released, and the brake-band control rod 54 is operated to cause the brake-band 21 to clampingly engage the casing, thus holding it stationary. The shafts 22 and 24 are drivingly connected together through the pinions 32 and 33, as above described, whereby the direction of rotation of shaft 24 will be opposite to that of shaft 22. The position of the lever 48 intermediate of either of the above described positions, will place the parts of the reverse gear in inoperative position, and the shafts 22 and 24 will be disconnected.

By the provision of a three part drum for the casing of the reverse gear of this invention, a reduction in the cost of manufacture is obtained, due to the ease experienced in making the parts and assembling the same. No particularly fine or difficult adjustments need be made in the machines for machining many of these parts, as the axial cuts required in forming the teeth and grooves in the casing parts 14, 15 and 16, may go clear through the same, not being interrupted by a shoulder or the like, necessitating an undercut into which the cutting tool must be relieved. This feature also facilitates the assembly of the reverse gear inasmuch as the interior parts may be assembled together and slipped into the casing before the end ring 15 and end plate 18 are assembled thereto.

The fact that no undercuts are required when cutting the grooves and teeth in these parts, permits the reverse gear to be more compact axially, due to the elimination of the space required for such undercuts, thus insuring a minimum overall length for the gear, which is an important advantage in most installations where even fractions of an inch are considered by engine and boat manufacturers as valuable space.

The provision in a reverse gear of this type, whereby the gear sleeves for the driving and driven shafts may readily be removed for attachment to their respective shafts, is especially advantageous. No manufacturing and assembling adjustments of the interior parts of the gear are disturbed, and there is no danger of improper reassembly of the interior parts, as no substantially essential parts are removed other than those that are readily replaced. By the provision of this structure, slight variations in axial dimensions and disposition of certain parts, such as the ends of shafts 22 and 24 and the sleeve gears 19 and 20, are possible, without causing difficulties in reinserting these sleeve gears in the casing, no other essential parts being dependent upon the exact axial location of these sleeves within reasonable limits. One particular advantage of the above provision is that before the reverse gear is installed, the driving and driven shafts may be assembled with their respective sleeves 19 and 20, and the outer bearings (not shown) thereof adjusted to provide the desired clearance between the opposing ends of the sleeves, and thus when these parts are assembled in the gear this can be done with facility and with assurance in advance of the exact disposition and interrelation of the sleeves which will be brought about.

The provision of the strain relieving means for the cooperating threads of the end plate 18, and the casing ring 15, which also centralizes the plate and insures alignment of the shafts 22 and 24, and the provision of the device for compensating for the weight of the remote control means, whereby friction and wear on certain parts of the gear are substantially eliminated, contribute towards the efficient operation and long life of a reverse gear embodying the features of this invention. Such features, in combination with the above mentioned novel three part casing and readily removable gear sleeves for the shafts, form an improved reverse gear having particularly smooth and efficient action, long life, sturdy structure and reliability, while being compact, readily assembled and installed, and of minimum dimensions.

While I have shown and described a preferred embodiment of my invention, it is understood that it is not to be limited to all of the details shown, but is capable of modification and variation which will lie within the spirit of the invention and within the scope of the appended claims.

What I claim is:

1. In a reverse gear, a pinion enclosing casing comprising a hollow drum-shaped member provided with removable end plates, said drum-shaped member being composed of a plurality of ring-shaped members in juxtaposed relation, one of said end plates being threadingly inserted into one end of said drum-shaped member, and means to secure the other of said end plates to the other end of said member, and to retain said ring-shaped members together.

2. In a reverse gear, a pinion enclosing casing comprising a hollow drum-shaped member provided with removable end plates, said drum-shaped member being composed of a plurality of ring-shaped members in juxtaposed relation, each of said end plates having an opening therein, and a sleeve gear in each opening, and adapted to be freely removed axially therefrom and reinserted therein for engagement with the interior mechanism of said reverse gear.

3. In a reverse gear, a hollow casing comprising a plurality of axially juxtaposed members, end plates for said casing, a series of clutch disks at each end of said casing adjacent the end plate thereat, a pinion cage disposed intermediate said series of disks, certain disks of each series being secured to an adjacent casing member for rotation therewith, said pinion cage being secured to an intermediate casing member for rotation therewith, means to connect all of said casing members, and means to clamp said pinion cage and the disks of each series together.

4. In a reverse gear, a hollow casing, end plates for said casing, a pinion cage disposed within said casing and being secured to said casing for rotation therewith, meshed pinons rotatably mounted in said pinion cage, a sleeve gear adapted to be readily inserted through and removed from an opening provided in each end plate for engagement with an disengagement from one of said pinions, and means to releasably retain one of said sleeve gears in inserted poistion.

5. In a reverse gear, a hollow casing, end plates for said casing, a pinion cage disposed within said casing and being secured to said casing for rotation therewith, meshed pinions rotatably mounted in said pinion cage, a sleeve gear adapted to be readily inserted through and removed from an opening provided in each end plate for engagement with and disengagement from one of said pinions, and detachable means engaging one of said end plates and one of said sleeve gears to retain the latter against axial movement when the same is disposed within the opening provided therefor.

6. In a reverse gear, a hollow casing, end plates for said casing, a series of clutch disks at each end of said casing adjacent the end plate thereat, a pinion cage disposed intermediate said series of disks, meshed pinions carried by said pinion cage, a sleeve gear disposed in an opening in each of said end plates and having teeth thereon adapted to mesh with the teeth of one of said pinions, certain disks of each series and said cage being secured to said casing for rotation therewith, and other disks of each series being engageable by one of said sleeve gears, each of said sleeve gears being axially removable from the opening wherein the same is disposed, out of engagement with the parts engaged thereby for connection with different shafts, and then reinserted and re-engaged without substantially disturbing any of the afore-mentioned parts from their initially assembled positions.

7. In a transmission gear of the type described, a drum-shaped casing having an end plate threadingly inserted into an end thereof, said end plate having an inwardly directed extension thereon adapted to engage said casing within the same, to centralize said plate relatively thereto and to relieve the co-operating threads from strains.

8. In a device of the type described, a hollow casing comprising a plurality of juxtaposed ring-shaped members, the end members and an intermediate member of which are each provided with grooves in the interior peripheral surface thereof, the grooves in said intermediate member being adapted to receive a rib formed upon an interiorly disposed part of said device.

9. In a device of the type described, a hollow casing comprising a plurality of juxtaposed ring-shaped members, the end members and an intermediate member of which are each provided with grooves in the interior peripheral surface thereof, the grooves in said intermediate member being adapted to receive a rib formed upon an interiorly disposed part of said device, one of said end members having threads upon a part of its internal periphery, and an end plate adapted to be threaded into said threaded end member, said end plate having an axially directed extension adapted to engage the grooved portion of said end member to centralize said end plate relatively thereto.

10. In a transmission gear, a driving shaft, a driven shaft, and means to drivingly connect said shafts comprising a hollow casing having end plates thereon, an opening in each of said end plates, sleeve-like members each adapted to be secured to one of said shafts and to be freely slidable in the opening in one of said end plates, and means within said casing to drivingly interconnect said sleeve-like members when the same are inserted through the aforesaid openings.

11. In combination, a transmission gear of the type described, a remote control therefor having a plurality of parts, said transmission gear having control means as a part thereof and including a shiftable collar, means connected to said remote control and engaging said collar to shift the same, and means engaging said collar shifting means to compensate for the stress placed thereon by the parts of said remote control.

12. In combination, a transmission gear of the type described, a remote control therefor having a plurality of parts, said transmission gear having control means as a part thereof and including a shiftable collar, means connected to said remote control and engaging said collar to shift the same in one direction, and resilient means engaging said collar shifting means to limit its movement in this collar shifting direction to relieve the pressure of said collar shifting means, caused by the parts of said remote control upon said collar.

13. In a transmission gear provided with a casing and end plates for said casing, a pair of shaft receiving sleeves, means in said casing to drivingly connect said sleeves, each of said sleeves being journaled in one of said end plates and extending into said casing, said sleeves being freely slidable axially in said end plates to permit the removal thereof from said casing and end plates for connection with a shaft and without substantially disturbing said connecting means or removing said end plates and means to releasably retain one of said sleeves against axial movement.

14. In a transmission gear provided with a casing and end plates for said casing, a pair of shaft receiving sleeves, means in said casing to drivingly connect said sleeves, each of said sleeves being journaled in one of said end plates and extending into said casing with their axes in alignment, and being axially slidable in opposite directions in said end plate for removal from said casing and end plates, and readily releasable means engaging one of said end plates and adapted to retain one of said sleeves against axial movement relatively to said plate.

15. In a reverse gear, a hollow drum-shaped pinion enclosing casing comprising a plurality of ring-shaped members in juxtaposed relation, the members adjacent the ends of said casing being provided with teeth formed upon the internal periphery thereof and extending entirely through said members, and a member having a groove formed in its internal periphery and extending entirely through said member disposed between said toothed members, a pinion cage within said casing and having a rib provided upon its periphery, said rib being adapted to be received in the groove in said casing member, and means to detachably connect said members together.

16. In a reverse gear, a hollow drum-shaped pinion enclosing casing comprising a plurality of ring-shaped members in juxtaposed relation, the members adjacent the ends of said casing being provided with teeth formed upon the internal periphery thereof and extending entirely through said members, and a member having a plurality of grooves formed in its internal periphery and extending entirely through said member disposed between said toothed members, a pinion cage within said casing and having spaced apart end plates connected by axially directed bars, a rib on each bar adapted to be received in a groove in said casing member, and means to detachably connect said members together.

17. In a reverse gear, a hollow casing, end plates for said casing, one of said end plates being axially adjustable relatively to said casing, a pinion cage disposed within said casing and being secured to said casing for rotation therewith, meshed pinions rotatably mounted in said pinion cage, and a sleeve gear adapted to be readily inserted through and removed from an opening provided in said axially adjustable casing end plate for engagement with and disengagement from one of said pinions.

18. In a reverse gear of the type described having a casing, a gear sleeve adapted to be connected to a power supplying shaft, a gear sleeve adapted to be connected to a driven shaft, said sleeves being in alignment, end plates for said casing, one of said end plates being axially adjustable relatively to said casing and having an opening therethrough to provide a bearing for said last mentioned gear sleeve, and means drivingly interconnecting said sleeves, said last named gear sleeve being freely slidable axially into and out of said casing through the opening in said adjustable end plate.

19. In a reverse gear of the type described having a casing, a gear sleeve adapted to be connected to a power supplying shaft, a gear sleeve adapted to be connected to a driven shaft, and means in said casing to drivingly connect said gear sleeves, an end plate secured to said casing and having an opening therethrough, one of said sleeves being journaled in the opening in said end plate and being axially removable therefrom while said plate is secured to said casing, and means to retain said sleeve within the aforesaid opening against axial movement relative to said casing.

20. In a reverse gear of the type described having a casing, a gear sleeve adapted to be connected to a power supplying shaft, a gear sleeve adapted to be connected to a driven shaft, and means in said casing to drivingly connect said gear sleeves, an end plate having an opening therethrough for said casing, one of said sleeves being journaled in the opening in said end plate and axially slidable therethrough, and a removable collar adapted to engage said end plate and said gear sleeve to retain the latter against axial movement in one direction relatively to said casing.

21. In a reverse gear, a hollow drum-shaped pinion enclosing casing comprising a plurality of ring-shaped members in juxtaposed relation, the members adjacent the ends of said casing being provided with clutch disk engaging means at the internal periphery thereof, and a member disposed between said first named members, a pinion cage within said casing and having spaced apart end plates connected by axially directed bars, means connecting said last mentioned casing member to said bars to prevent relative rotatable movement therebetween, comprising a rib on one adapted to be received in a groove in the other, and means to detachably connect said casing members together.

22. In a reverse gear, the combination of a housing, transmission members therein, a clutch for interlocking said transmission members, clutch shifting means including a lever and a shifting collar operated thereby, a remote control device operatively connected to said clutch shifting means, and adjustable means including a resilient abutment to take up the thrust of said remote control device when said clutch has been engaged.

23. In a reverse gear, a hollow casing, removable end plates for said casing, each having an opening therethrough, one of said end plates being adjustable axially with respect to said casing, meshed pinions rotatably mounted within said casing, and a shaft receiving sleeve gear readily insertable into said casing through the opening in said axially adjustable end plate to engage one of the pinions within said casing.

24. In a reverse gear, a hollow casing, clutch disks within said casing, an end plate, clutch disk engaging and compressing means mounted on said end plate, said end plate threadingly engaging said casing within an end thereof for axial movement with respect to said casing to adjust said clutch disk engaging means, and means to relieve the cooperating threads between said end plate and said casing from strains.

25. In a reverse gear, a hollow casing, an axially adjustable end plate secured to one end of said casing, means to secure said end plate to said casing, and means between said end plate and said casing and acting thereon to relieve said securing means of transversely directed strains, said end plate having an opening therein and a shaft receiving sleeve gear freely slidable into and out of said casing through the opening in said end plate.

26. In combination, a transmission gear of the type described and having control means, a remote control having a plurality of connected parts operatively connected to said gear control means, and means engaging a part of said gear control to compensate for the stress placed thereon by the parts of said remote control.

27. In combination, a transmission gear of the type described and having control means, a remote control for said gear connected to said gear control and including a part normally pressing thereagainst, and means acting against said gear control to neutralize the force of said pressure.

28. In a reverse gear of the type described, a hollow casing comprising an intermediate cylindrical part disposed between a pair of internally toothed cylindrical parts, the end faces of adjacent parts abutting and the internal teeth of the toothed parts starting at and extending axially away from the abutting end faces of said intermediate part, means to secure said parts together in axial alignment, one of said toothed parts having an axially directed cylindrical extension provided with internal screw threads, and an end plate for said casing adapted to threadingly engage said screw threads within said extension.

29. In a reverse gear of the type described, a hollow casing comprising an intermediate cylindrical part disposed between a pair of internally toothed cylindrical parts, the end faces of adjacent parts abutting and the internal teeth of the toothed parts starting at and extending axially away from the abutting end faces of said intermediate part, means to secure said parts together in axial alignment, one of said toothed parts having an axially directed cylindrical extension, an end plate for said casing, and cooperating means between said cylindrical extension and said end plate to connect the same, said means permitting axial adjustment between said cylindrical extension and said end plate.

30. In a reverse gear of the type described, a hollow casing comprising an intermediate cylindrical part disposed between a pair of internally toothed cylindrical parts, the end faces of adjacent parts abutting and the internal teeth of the toothed parts starting at and extending axially away from the abutting end faces of said intermediate part, means to secure said parts together in axial alignment, one of said toothed parts having an axially directed cylindrical extension provided with internal screw threads, and an end plate for said casing adapted to threadingly engage said screw threads within said extension, said end plate having an axial extension adapted to extend into the last mentioned toothed part and to engage the tooth thereof to centralize said end plate and relieve said screw threads from strains.

In witness whereof, I have hereunto set my hand this 5th day of February, 1929.

ARTHUR T. NABSTEDT.